United States Patent [19]

Higgins

[11] 3,795,757

[45] Mar. 5, 1974

[54] DISTRIBUTION CABLE WITH PERMANENTLY CONNECTED BRANCH CABLES AND METHOD OF EFFECTING SAID CONNECTIONS

[75] Inventor: Peter Higgins, Hounslow, England

[73] Assignee: British Insulated Gallender's Cables Limited, London, England

[22] Filed: Oct. 2, 1972

[21] Appl. No.: 294,077

[52] U.S. Cl. ................ 174/72 R, 29/628, 174/71 C
[51] Int. Cl. .......................... H01r 3/02, H01r 43/00
[58] Field of Search .... 174/71 R, 71 C, 72 R, 88 R, 174/88 C; 29/628; 156/49; 307/147

[56] References Cited
UNITED STATES PATENTS
3,626,082  12/1971  Kasai et al. ..................... 174/72 R FOREIGN PATENTS OR APPLICATIONS
647,512  8/1962  Canada ............................ 174/71 R
727,111  3/1955  Great Britain .................... 174/71 R
837,352  6/1960  Great Britain ....................... 156/49

Primary Examiner—Laramie E. Askin
Attorney, Agent, or Firm—Buell, Blenko & Ziesenheim

[57] ABSTRACT

An electrical distribution cable comprises a neutral conductor and a number of insulated power conductors all helically laid up together and having branch cables permanently connected to it at spaced locations along its length before it is installed. Each of the branch cables comprises at least one insulated power conductor which is connected to a power conductor of the distribution cable and a neutral conductor, in the form of an outer concentric conductor which is connected to the neutral conductor of the distribution cable by a metal strip wrapped around the outer concentric conductor of the branch cable and the assembly of cores of the distribution cable and permanently secured to the outer concentric conductor of the branch cable and to the neutral conductor of the distribution cable.

11 Claims, 1 Drawing Figure

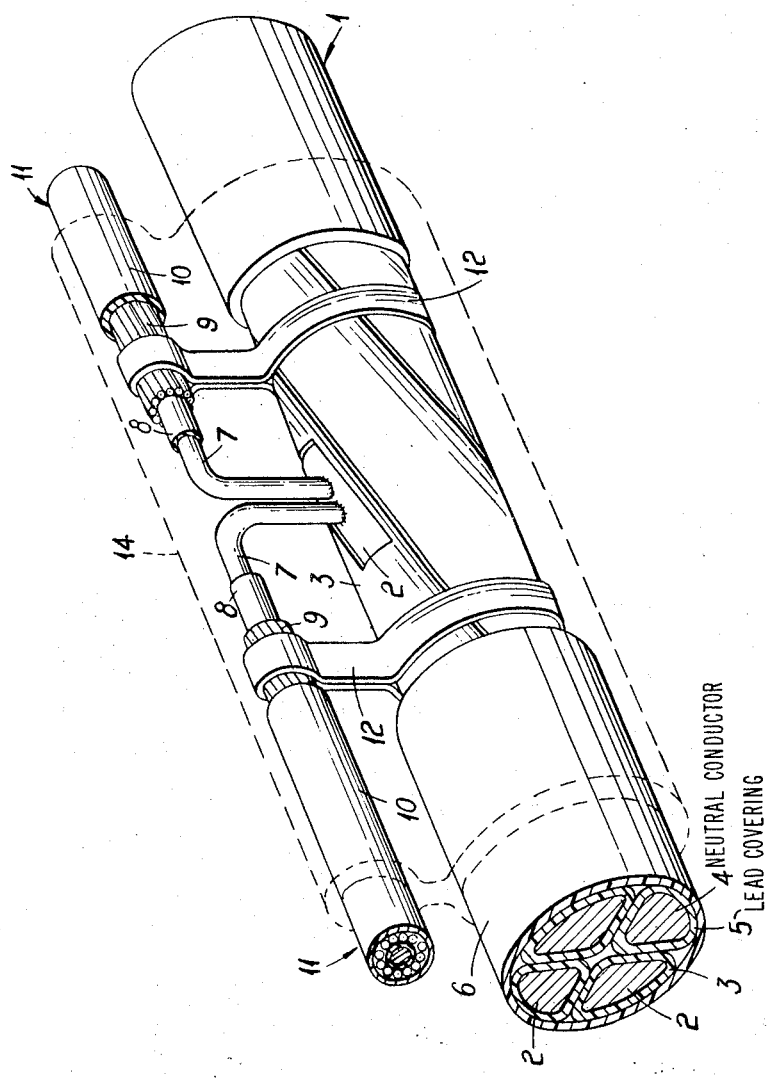

DISTRIBUTION CABLE WITH PERMANENTLY CONNECTED BRANCH CABLES AND METHOD OF EFFECTING SAID CONNECTIONS

This invention relates to electric power distribution cables comprising a neutral conductor and a number of insulated power conductors (or cores), normally one for each phase, all helically laid up together. Such cables are used for local distribution of power to consumers, for example in houses or factories, through single or multi-phase branch cables referred to as consumer service cables, which during their installation are connected to the distribution cable at service joint boxes.

It is an object of the invention to provide a distribution cable of this kind which can be used without service joint boxes.

The distribution cable in accordance with the invention has branch cables permanently connected to it at spaced locations along its length before it is installed, each of which branch cables comprises at least one insulated power conductor which is connected to a power conductor of the distribution cable, and an outer concentric conductor which is electrically and mechanically connected to the neutral conductor of the distribution cable by a metal strip wrapped around the outer concentric conductor of the branch cable and the assembly of cores of the distribution cable and permanently secured to the outer concentric conductor of the branch cable and to the neutral conductor of the distribution cable.

Where, as is normal, the distribution and branch cables are each protected by a plastic sheath, each permanent connection between the distribution cable and a branch cable at each spaced location along the length of the distribution cable is preferably surrounded and protected by a moulded body of plastic insulating material.

Some or all of the branch cables may be of sufficient length to be used directly as service cables or alternatively they may be in the form of short lengths to which service cables can be connected, for instance by the method which is the subject of my British Pat. application No. 55685/69 on which a patent has been granted under U.S. No. 1,285,598 and in which each of some or all of the branch cables has before the distribution cable is installed, permanently connected to its power and outer concentric conductors at its free end (that is the end not permanently connected to the distribution cable) one part of an insulated two-part connector suitable for connecting said power and outer concentric conductors to the corresponding conductors of a consumer service cable.

The invention also includes a method of permanently connecting a branch cable comprising at least one insulated power conductor and a neutral conductor to a distribution cable of the kind specified before the distribution cable is installed, which method includes the steps of cutting back an end of the branch cable to expose the neutral conductor and the power conductor that is to be connected to a power conductor of the distribution cable; applying a metal strip around the assembly of cores of the distribution cable and around the exposed neutral conductor of the branch cable; welding or otherwise permanently electrically and mechanically connecting the metal strip to the neutral conductor of the distribution cable and to the neutral conductor of the branch cable; electrically connecting the exposed power conductor of the branch cable to a power conductor of the distribution cable; and applying insulation to the connections thus made, preferably by pouring or injecting an insulating compound into a mould which is fitted around the distribution cable and which may or may not be removed after the insulating compound has set.

The invention is especially applicable to distribution cables in which the power conductors are individually insulated with rubber or plastic insulation an in which the assembly of cores is protected by a rubber or plastic sheath and, when using the above described method of connection for such a cable, a part of the insulation of the power conductor of the distribution cable is necessarily cut away to enable the power conductor of the branch cable to be welded or otherwise electrically connected and the body of insulating material moulded around the connections can also replace the part of the sheath necessarily cut away to gain access to the assembly of cores.

The distribution cable will normally be a three-phase cable and in this case the branch cable will generally, but not necessarily, be a single phase cable comprising a single power conductor surrounded by an outer concentric conductor. The metal strip for electrically and mechanically connecting the neutral conductors of the distribution and branch cables may be preformed to a cross-sectional shape approximating that of a dumb-bell, one part of the dumb-bell having an internal diameter approximating the external diameter of the outer concentric conductor of the branch cable and the other part of the dumb-bell being divided into two separable parts to facilitate application of the preformed strip over the assembly of cores of the distribution cable and being adapted to have an internal diameter approximating the external diameter of the assembly of cores.

The assembly of cores of the distribution cable may be surrounded by an outer conductive layer in electrical contact with the neutral conductor, for instance a layer or layers of helically lapped metal tape. In this case the metal strip is preferably welded or otherwise permanently secured both to the outer conductive layer and to the underlying neutral conductor by removing a part of the outer conductive layer overlying the neutral conductor before the weld is effected. It will also be necessary to remove a part of the outer conductive layer overlying the power conductor to which the power conductor of a branch cable is to be connected.

It is convenient to connect two branch cables simultaneously to the distribution cable at the same location and to use a single body of insulating material to surround and protect the connections made with both branch cables.

Although the branch cables may each be permanently connected to the distribution cable after the cables have been sheathed by removing part of the sheath of the distribution cable at each location where a branch cable is to be connected, the branch cables may alternatively be permanently connected to the distribution cable before the cables are sheathed by arranging the branch cables each to extend alongside and be spaced from the distribution cable over substantially the whole length of the branch cables and by continuously extruding a sheathing body of rubber or plastic material over the assembly so formed to embed the distribution and branch cables therein.

The invention is further illustrated by a description, by way of example, of a four-core distribution cable in accordance with the invention, with reference to the accompanying drawing which shows a fragmental perspective view of the cable.

Referring to the drawing, the distribution cable 1 comprises three solid aluminium power conductors 2 each enclosed in an extruded insulating covering 3 of ethylene propylene rubber and a solid aluminium neutral conductor 4 enclosed in an extruded lead covering 5, the cores so formed being helically laid up together and surrounded by an outer protective sheath 6 of polyvinyl chloride. At each of a plurality of locations spaced along the length of the distribution cable 1 ends of two single-core branch cables 11 comprising a solid aluminium power conductor 7, extruded insulation 8 of polyvinyl chloride, an outer concentric stranded conductor 9, and a sheath 10 of polyvinyl chloride, which extend alongside the distribution cable, are permanently connected to it.

In effecting the connections between the distribution and branch cables a part of the sheath 6 is removed to expose the assembly of cores and, after cutting back the ends of the branch cables 11 in the normal way, the outer concentric conductor 9 of each branch cable is electrically connected to the neutral conductor 4 of the distribution cable by applying a metal strip 12 about the conductor 9 and about the assembly of cores and welding it to the conductor 9 and to the underlying neutral conductor 4. A part of the insulation 3 of the power conductor 2 to which connection is to be made is removed, the conductors 7 of the branch cables are welded to the exposed power conductor 2 and the completed joints are embedded in a moulded body 14 of polyvinyl chloride which bonds to the sheaths 6 and 10.

The method in accordance with the invention has the advantage that it simplifies effecting of an electrical connection between the neutral conductors of the distribution and branch cables because the position of the power conductor of the distribution cable to which connection is to be made with respect to the neutral conductor is immaterial and the metal strip can be welded or otherwise permanently electrically and mechanically connected to the neutral conductor at any point in its periphery that is in contact with the neutral conductor.

The distribution cable in accordance with the invention can be manufactured and laid more economically then distribution cables at present in use since when installed it does not have to be opened up at spaced locations under restricted conditions in a cable trench for the connections to a service cable to be made. These connections are made much more simply and satisfactorily, for example, in the factory or in a workshop, before installation of the distribution cable and when the branch cables are long enough to reach the consumer's premises no outside jointing on site is required. When short branch cables are provided they can be connected during installation to lengths of service cable by a simple straight through joint or by a simple insulated two-part connector.

What I claim as my invention is:

1. A distribution cable comprising a neutral conductor and a number of insulated power conductors all helically laid up together and having branch cables permanently connected to it at spaced locations along its length before it is installed, each of which branch cables comprises at least one insulated power conductor which is connected to a power conductor of the distribution cable and an outer concentric conductor which is electrically and mechanically connected to the neutral conductor of the distribution cable by a metal strip wrapped around the outer concentric conductor of the branch cable and the assembly of cores of the distribution cable and permanently secured to the outer concentric conductor of the branch cable and to the neutral conductor of the distribution cable.

2. A distribution cable as claimed in claim 1, wherein the metal strip is preformed to a cross-sectional shape approximating that of a dumb-bell, one part of the dumb-bell fitting tightly around the outer concentric conductor of the branch cable and the other part of the dumb-bell being divided into two separable parts which together fit tightly around the assembly of cores of the distribution cable.

3. A distribution cable as claimed in claim 1 wherein the assembly of conductors of the distribution cable is surrounded by an outer conductive layer in electrical contact with the neutral conductor.

4. A distribution cable as claimed in claim 3, wherein the metal strip is permanently secured to the outer conductive layer of the distribution cable.

5. A distribution cable as claimed in claim 1, wherein at least two branch cables are connected at each of at least some of said spaced locations along the length of the distribution cable.

6. A distribution cable as claimed in claim 1, wherein at least some of the permanently connected branch cables are of sufficient length to be used directly as service cables.

7. A distribution cable as claimed in claim 1, wherein the power conductors of the distribution cable and of the branch cables are individually insulated with an insulating material selected from the group of materials consisting of rubber and plastic materials and wherein the distribution cable and each branch cable are each individually protected by a sheath of an insulating material selected from the group of materials consisting of rubber and plastic materials.

8. A distribution cable as claimed in claim 7, wherein each permanent connection between the distribution cable and a branch cable at each spaced location along the length of the distribution cable is surrounded and protected by a moulded body of an insulating material selected from the group of materials consisting of rubber and plastic materials.

9. A method of permanently connecting a branch cable comprising at least one insulated power conductor and a neutral conductor to a distribution cable before the distribution cable is installed, said distribution cable comprising a neutral conductor and a number of insulated power conductors all helically laid up together, which method includes the steps of cutting back an end of the branch cable to expose the neutral conductor and the power conductor that is to be connected to a power conductor of the distribution cable;

applying a metal strip around the assembly of cores of the distribution cable and around the exposed neutral conductor of the branch cable;

permanently electrically and mechanically connecting the metal strip to the neutral conductor of the distribution cable and to the neutral conductor of the branch cable;

electrically connecting the exposed power conductor of the branch cable to a power conductor of the distribution cable;

and applying insulation to the connections thus made.

10. A method of permanently connecting a branch cable comprising at least one insulated power conductor and a neutral conductor to a distribution cable before the distribution cable is installed, said distribution cable comprising a neutral conductor and a number of insulated power conductors all helically laid up together, which method includes the steps of cutting back an end of the branch cable to expose the neutral conductor and the power conductor that is to be connected to a power conductor of the distribution cable;

applying a metal strip around the assembly of cores of the distribution cable and around the exposed neutral conductor of the branch cable;

permanently electrically and mechanically connecting the metal strip to the neutral conductor of the distribution cable and to the neutral conductor of the branch cable; electrically connecting the exposed power conductor of the branch cable to a power conductor of the distribution cable;

fitting a mould around the distribution cable in the vicinity of each connection thus made;

and introducing a hardenable insulating compound into the mould to insulate the connection.

11. A method as claimed in claim 10, which includes the additional step of removing the mold after the insulating compound has set.

* * * * *